United States Patent
Hanske et al.

(10) Patent No.: US 10,654,555 B2
(45) Date of Patent: May 19, 2020

(54) WINDOW ASSEMBLY FOR AN AIRCRAFT

(71) Applicant: AIRBUS OPERATIONS GMBH, Hamburg (DE)

(72) Inventors: Claus Hanske, Hamburg (DE); Hans-Jürgen Weber, Hamburg (DE); Bernd Kruse, Hamburg (DE); Christoph Cordes, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 341 days.

(21) Appl. No.: 15/596,748

(22) Filed: May 16, 2017

(65) Prior Publication Data

US 2017/0334540 A1 Nov. 23, 2017

(30) Foreign Application Priority Data

May 19, 2016 (EP) .................................. 16170361

(51) Int. Cl.
*B64C 1/14* (2006.01)

(52) U.S. Cl.
CPC .......... *B64C 1/1492* (2013.01); *B64C 1/1484* (2013.01)

(58) Field of Classification Search
CPC .................................................. B64C 1/1492
See application file for complete search history.

(56) References Cited

U.S. PATENT DOCUMENTS

| 5,271,581 A * | 12/1993 | Irish ...................... B64C 1/1492 244/129.3 |
| 5,467,943 A * | 11/1995 | Umeda ............. B32B 17/10018 114/173 |
| 5,884,865 A | 3/1999 | Scherer et al. |
| 5,988,566 A | 11/1999 | Meyer |
| 8,371,531 B2 * | 2/2013 | Gallant ................. B64C 1/1492 244/129.3 |
| 2008/0078877 A1* | 4/2008 | Switzer ................. B64C 1/1492 244/129.3 |
| 2009/0181203 A1 | 7/2009 | Valentin et al. |

(Continued)

FOREIGN PATENT DOCUMENTS

| EP | 0322776 A2 | 7/1989 |
| EP | 0936138 B1 | 5/2003 |

(Continued)

OTHER PUBLICATIONS

Extended European Search Report for Application No. 16170361 dated Oct. 28, 2016.

*Primary Examiner* — Jessica B Wong
(74) *Attorney, Agent, or Firm* — Jenkins, Wilson, Taylor & Hunt, P.A.

(57) ABSTRACT

A window assembly for an aircraft includes a window frame being arranged bordering a window opening in a hull of the aircraft, a window seal being attached to the window frame, a window being supported by the window frame and sealed to the window frame by the window seal, a window retainer covering the window seal and the window frame from the inside of the aircraft, and a transparent vapor barrier being supported by the window retainer and covering the window from the inside of the aircraft such that an air gap is formed between the window and the transparent vapor barrier.

7 Claims, 1 Drawing Sheet

(56) References Cited

U.S. PATENT DOCUMENTS

2014/0314973 A1* 10/2014 Desroches ............ B64C 1/1492
                                                      428/34
2015/0143684 A1    5/2015 Ebner et al.
2016/0375980 A1* 12/2016 Orlov .................... B64C 1/1484
                                                      244/129.3

FOREIGN PATENT DOCUMENTS

| EP | 0846616 B1 | 2/2004 |
| EP | 0846615 B1 | 7/2004 |
| WO | WO 2006/132736 A1 | 12/2006 |
| WO | WO 2012/020078 A1 | 2/2012 |

* cited by examiner

WINDOW ASSEMBLY FOR AN AIRCRAFT

CROSS-REFERENCE TO RELATED APPLICATION

This application claims priority to European Patent Application EP 16 170 361.6 filed May 19, 2016, the entire disclosure of which is incorporated by reference herein.

TECHNICAL FIELD

The present disclosure pertains to a window assembly for an aircraft.

BACKGROUND

Although generally applicable to windows for any kind of aircraft, the present disclosure and the problem on which it is based will be explained in greater detail with reference to commercial passenger aircraft.

The windows of modern passenger airplanes typically feature a fail-safe design based on a double-pane window concept. Here, a pressurized outer pane and a none-pressurized inner pane are spaced apart from one another with a window interspace in between filled with air. The panes themselves are often formed from a transparent thermoplastic material like polymethyl methacrylate (PMMA), also known as acrylic or acrylic glass, which is relatively lightweight and shatter-resistant compared to plain glass. Both panes are fixed and sealed to a window frame, which amongst others may include a spacer or similar that sets the window interspace to a desired depth. Usually, both panes are assembled within one common window seal as a joint window set, which in turn is fixed to the window-frame from the inside of the aircraft by a so-called retainer that covers the window seal together with the outer rims of the window panes and the window frame. Such a double pane design, as disclosed for example in documents EP 0936138 B1, EP 0846615 B1 and EP 0846616 B1, has the important advantage that the panes form a thin air gap, which enables fogging-free behavior of the window assembly.

SUMMARY

One of the ideas of the present disclosure to find solutions for aircraft windows with reduced weight and costs that are simple to install.

According to a first aspect of the disclosure herein, a window assembly for an aircraft comprises a window frame being arranged bordering a window opening in a hull of the aircraft, a window seal being attached to the window frame, a window being supported by the window frame and sealed to the window frame by the window seal, a window retainer covering the window seal and the window frame from the inside of the aircraft, and a transparent vapor barrier being supported by the window retainer and covering the window from the inside of the aircraft such that an air gap is formed between the window and the transparent vapor barrier.

According to a second aspect of the disclosure herein, an aircraft comprises a window assembly according to the first aspect of the disclosure herein.

The present disclosure relies on the fundamental insight that from a structural point of view two or more glass panes are not necessary to fulfill all stress and safety requirements of a window system. On the contrary, each built-in glass pane unnecessarily increases the weight and costs of the window system. Thus, one idea of the present disclosure is to implement a fogging-free behavior without introducing additional window panes. To this end, the present disclosure provides an air-gap in between the actual window and a transparent vapor barrier, the latter being particularly provided for this purpose. Like this, already a single pane window may be sufficient to provide the required stress performance and/or safety requirements of the window assembly, while the transparent vapor barrier may be configured in an as lightweight as possible manner.

Basically, the vapor barrier may be a thin foil or similar as long as it provides transparency as well as air tightness. As a consequence, the window assembly according to the disclosure herein may be provided in a very lightweight and cost-efficient configuration compared to common window systems. Furthermore, the window assembly according to the disclosure herein offers straightforward installation, as the transparent vapor barrier may just be mounted after the main installation of the window itself, e.g. in a second step together with the window retainer. As the person of skill will be aware, aircraft windows are typically installed by applying significant pressure on the window panes from the outside and/or from the inside of the aircraft. One approach in aircraft construction is to manually force the windows (e.g. a double-pane window) into the respective window frames by pushing against the window from the outside and/or from the inside. In a subsequent step, the window retainers may be screwed or bolted against the installed windows from the inside. In case of the present disclosure, the transparent vapor barrier may not be installed until after the window itself has been forced into the window frame. For example, in some embodiments of the disclosure herein, the transparent vapor barrier may even be installed after the window retainer has been screwed or otherwise fastened to the window assembly. Due to this, the transparent vapor barrier of the disclosure herein may be formed as lightweight as possible.

Advantageous and example embodiments and improvements of the present disclosure are described herein.

According to an embodiment of the disclosure herein, the window may be configured as a single-pane window. One single (outer) pane can fulfill all stress and/or safety requirements such that one or more additional inner panes are dispensable from a stress and/or safety point of view (weight and cost reduction). The air-gap-function may be taken over by the transparent vapor barrier of the disclosure herein. Hence, the window assembly of this embodiment comprises two transparent layers, i.e. a rigid transparent window pane providing structural strength and a thin transparent vapor barrier providing fogging-free behavior. The single pane may be for example formed from a transparent laminated thermoplastic or similar material.

According to an embodiment of the disclosure herein, the transparent vapor barrier may be detachably mounted to the window retainer. The person of skill will be aware of various possible implementations including without limitation push-fit fittings, plug-in connections, snap-in locking connections, screwed connections, and so on.

The transparent vapor barrier may be mounted to the window retainer with a snap-fit connection. In one particularly advantageous embodiment, the transparent vapor barrier may hence be just clicked into the window retainer either before installation of the retainer, such that retainer and vapor barrier may be mounted together to the window assembly, or after installation of the retainer, such that the vapor barrier may just be clicked into the already installed window retainer.

According to an alternative embodiment of the disclosure herein, the transparent vapor barrier may be integrally formed with the window retainer. For example, the window retainer may be a plastic component with a non-transparent, rigid outer frame or ring and an inner thin transparent plastic pane or foil that serves as the vapor barrier.

According to an embodiment of the disclosure herein, the transparent vapor barrier may be sealed to the window frame by the window seal. The transparent vapor barrier thus closes off an air gap together with the window, which may be configured for example as a single transparent pane, where the joined vapor barrier and window may thus be advantageously sealed with one joined seal.

According to an embodiment of the disclosure herein, the transparent vapor barrier may be connected to the window seal with a ring membrane. Here, the ring membrane effectively serves as an interface to the window seal. To this end, the transparent vapor barrier, e.g. in form of a thin foil, may be arranged with an outer rim beneath or above the ring membrane. The window retainer may then push the transparent vapor barrier together with the ring membrane against the window seal such that these components are fixed against each other. The ring membrane may be particularly configured with a specific stiffness such that loads may be transferred from the window retainer. In another embodiment, the ring membrane may be integrated into the window seal.

The transparent vapor barrier may be integrally formed with the ring membrane. In one particular embodiment, the window seal may be formed with a socket or slot or the like to take in the ring membrane of the transparent vapor barrier such that the transparent vapor barrier may be sealed to the window seal. The window retainer may be placed upon the thus mounted transparent vapor barrier and the window seal from the inside of the aircraft to hold and close-off the window assembly from the inside.

According to an embodiment of the disclosure herein, the transparent vapor barrier may be configured as a transparent airtight foil.

BRIEF DESCRIPTION OF THE DRAWINGS

The disclosure herein will be explained in greater detail with reference to example embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Figure 1:
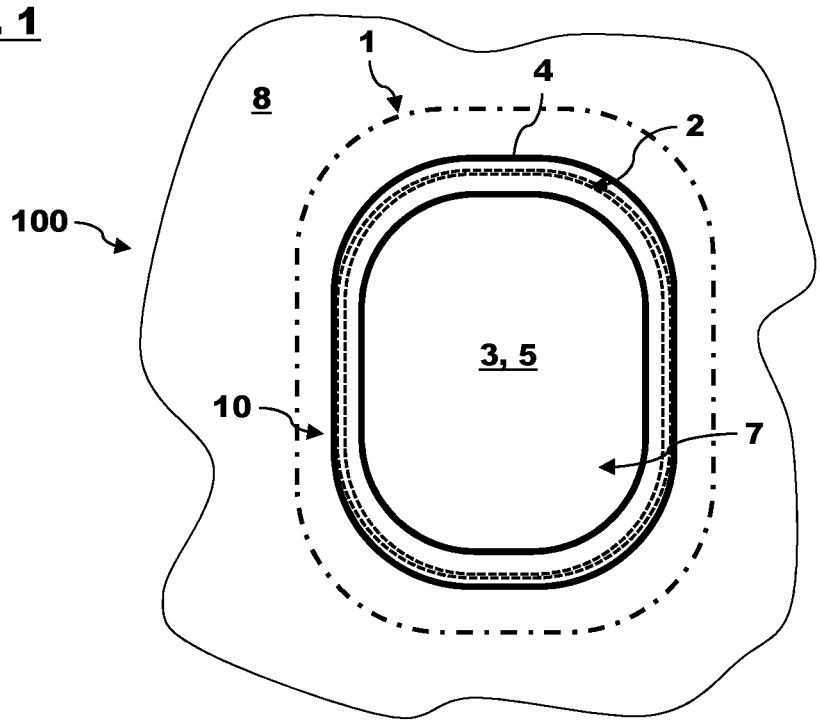
FIG. 1 schematically shows a front view of a window assembly from the inside of an aircraft according an embodiment of the disclosure herein.
Figure 2A:
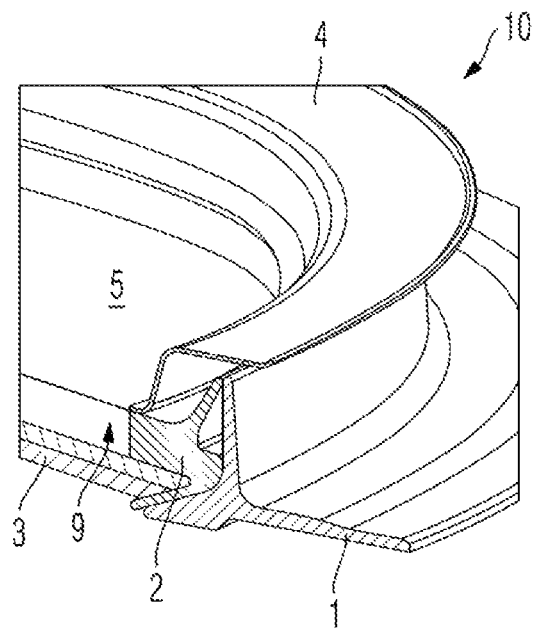
FIG. 2a, 2b schematically depict two exemplary window assemblies in perspective sectional views according to further embodiments of the disclosure herein.
Figure 2B:
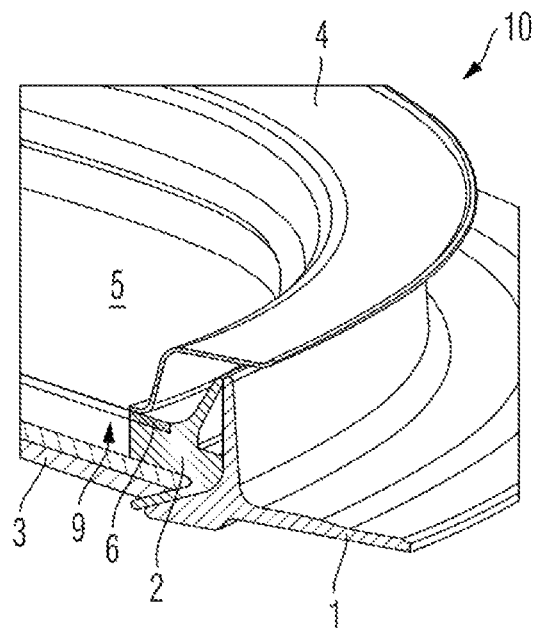

FIG. 1 schematically shows a front view of a window assembly 10 from the inside of an aircraft 100 according an embodiment of the disclosure herein. FIG. 2a, 2b schematically depict two exemplary window assemblies 10 in perspective sectional view according to further embodiments of the disclosure herein. While FIG. 1 shows a basic window assembly 10, FIGS. 2a, 2b depict detailed views of exemplary window assemblies as they may be installed within an aircraft in accordance with FIG. 1. The aircraft 100 may be, for example, a passenger aircraft or the like, which may be equipped with a plurality of such window assemblies along its hull 8.

The window assembly 10 generally comprises a window frame 1 being arranged bordering a window opening 7 in the hull 8 of the aircraft 100. The window assembly 10 further comprises a window seal 2 being attached to the window frame 1. The window seal 2 may comprise a sealant including polysulfide or silicone sealant or similar material that prevents humid outside air from entering. Furthermore, the window assembly 10 comprises a window 3 being supported by the window frame 1 and sealed to the window frame 1 by the window seal 2. The window 3 may be particularly configured as a single pane formed of PMMA or a similarly suited material known to the person of skill. The window assembly 10 further comprises a window retainer 4 covering the window seal 2 and the window frame 1 from the inside of the aircraft 100. The window retainer 4 may, for example, be formed from a plastic material and be configured rigidly. The window retainer 4 may further be screwed or bolted to the window frame 1, such that the window retainer 4 holds and fastens the components of the window assembly 10 together, in particular the window 3 and/or the window seal 2 may be fastened like this to the window frame 1.

The window assembly 10 further comprises a transparent vapor barrier 5 being supported by the window retainer 4 and covering the window 3 from the inside of the aircraft 100. An air gap 9 is thus formed between the window 3 and the transparent vapor barrier 5, which amongst others may enable fogging-free behavior of the window assembly 10 even though only one single glass pane is utilized. The window assembly 10 thus may significantly reduce weight and costs compared to common double- or triple-pane windows. The transparent vapor barrier 5 may be configured as thin as possible as it does not need to fulfill the same requirements with regards to stress, safety and/or load handling as a window pane. Furthermore, the installation of the window assembly 10 may be kept very simple.

Generally, the present disclosure implements various configurations of the transparent vapor barrier 5 and its installation. FIGS. 2a and 2b show two such alternatives. In the window assembly 10 in FIG. 2a, the transparent vapor barrier 5 is formed as one component together with the window retainer 4. To this end, the window retainer 4 may be formed as a rigid and non-transparent frame or ring. The transparent vapor barrier 5 is however formed airtight as a thin transparent plastic pane or foil. The window retainer 4 may be fastened to the window seal 2 and/or the window frame 1 together with the transparent vapor barrier 5. As a further alternative, the transparent vapor barrier 5 may be detachably mounted to the window retainer 4. For this purpose, the window retainer 4 may be configured with a slot or socket or similar such that a snap-fit or snap-and-click functionality may be achieved, wherein the transparent vapor barrier 5 may simply be clicked into the window retainer 4 either before or after fastening the window retainer 4 to the window frame 1 and/or the window seal 2.

Referring now to the embodiment of FIG. 2b, the transparent vapor barrier 5 has an outer ring membrane 6, by which it is inserted into an appropriately formed recess or slot within the window seal 2. In this embodiment, the window retainer 4 is fastened to the window seal 2 and/or the window frame 1 such that it pushes on the ring membrane 6 of the transparent vapor barrier 5 and thus keeps the transparent vapor barrier 5 within a desired distance from the window 3, i.e. the single window pane, to set a defined air gap between the window 3 and the transparent vapor barrier 5. However, in further alternative embodiments, the ring membrane 6 may be a separate component, which is placed beneath or above an outer rim of the transparent vapor barrier 5.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. Many other examples will be apparent to one skilled in the art upon reviewing the above specification.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A window assembly for an aircraft, comprising:
   a window frame arranged bordering a window opening in a hull of the aircraft;
   a window seal attached to the window frame;
   a window supported by the window frame and sealed to the window frame by the window seal;
   a window retainer covering the window seal and the window frame from an inside of the aircraft; and
   a transparent vapor barrier supported by the window retainer and covering the window from the inside of the aircraft such that an air gap is formed between the window and the transparent vapor barrier;
   wherein the transparent vapor barrier is configured as a transparent airtight foil.

2. The window assembly of claim 1, wherein the window is configured as a single-pane window.

3. The window assembly of claim 1, wherein the transparent vapor barrier is detachably mounted to the window retainer.

4. The window assembly of claim 3, wherein the transparent vapor barrier is mounted to the window retainer with a snap-fit connection.

5. The window assembly of claim 1, wherein the transparent vapor barrier is integrally formed with the window retainer.

6. The window assembly of claim 1, wherein the transparent vapor barrier is sealed to the window frame by the window seal.

7. An aircraft comprising a window assembly, the window assembly including:
   a window frame arranged bordering a window opening in a hull of the aircraft;
   a window seal attached to the window frame;
   a window supported by the window frame and sealed to the window frame by the window seal;
   a window retainer covering the window seal and the window frame from an inside of the aircraft; and
   a transparent vapor barrier supported by the window retainer and covering the window from the inside of the aircraft such that an air gap is formed between the window and the transparent vapor barrier;
   wherein the transparent vapor barrier is configured as a transparent airtight foil.

\* \* \* \* \*